US008250044B2

(12) United States Patent
Santosuosso (10) Patent No.: US 8,250,044 B2
(45) Date of Patent: *Aug. 21, 2012

(54) BYTE-CODE REPRESENTATIONS OF ACTUAL DATA TO REDUCE NETWORK TRAFFIC IN DATABASE TRANSACTIONS

(75) Inventor: John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 689 days.

This patent is subject to a terminal disclaimer.

(21) Appl. No.: 12/181,090

(22) Filed: Jul. 28, 2008

(65) Prior Publication Data
US 2008/0306920 A1    Dec. 11, 2008

Related U.S. Application Data

(63) Continuation of application No. 10/388,070, filed on Mar. 13, 2003, now Pat. No. 7,433,861.

(51) Int. Cl.
*G06F 17/30* (2006.01)
(52) U.S. Cl. ...................................................... 707/693
(58) Field of Classification Search .................. 707/693
See application file for complete search history.

(56) References Cited

U.S. PATENT DOCUMENTS

| | | | |
|---|---|---|---|
| 5,377,329 A | | 12/1994 | Seitz |
| 5,666,330 A | | 9/1997 | Zampetti |
| 5,675,789 A | | 10/1997 | Ishii et al. |
| 5,745,898 A | * | 4/1998 | Burrows ............................ 1/1 |
| 5,794,228 A | | 8/1998 | French et al. |
| 5,918,225 A | * | 6/1999 | White et al. ........................ 1/1 |
| 5,924,096 A | | 7/1999 | Draper et al. |
| 5,953,503 A | * | 9/1999 | Mitzenmacher et al. ..... 709/203 |
| 5,978,791 A | * | 11/1999 | Farber et al. .................. 707/640 |
| 5,991,771 A | | 11/1999 | Falls et al. |
| 6,052,797 A | | 4/2000 | Ofek et al. |
| 6,092,071 A | | 7/2000 | Bolan et al. |
| 6,125,209 A | | 9/2000 | Dorricott |
| 6,182,121 B1 | | 1/2001 | Wlaschin |
| 6,356,888 B1 | | 3/2002 | Egan et al. |
| 6,405,187 B1 | | 6/2002 | Egan et al. |

(Continued)

OTHER PUBLICATIONS

Anderson et. al. "Indexing Strategies for DB2 UDB for iSeries," Version 2.1, updated Oct. 2002, http://www.919.ibm.com/servers/eserver/iseries/developer/bi/documents/strategy/strategy.pdf (last accessed Mar. 13, 2002).

(Continued)

*Primary Examiner* — Mark A Radtke
(74) *Attorney, Agent, or Firm* — Patterson & Sheridan, LLP (57) ABSTRACT

Methods, articles of manufacture, and systems for reducing network traffic for database transactions between a requesting client and a database server are provided. For some embodiments, the client may access statistical information regarding the data, such as that commonly contained in indexes (e.g., encoded vector indexes), conventionally generated for use by a query optimizer. For some embodiments, based on the statistical information regarding the data, the client may request that the server send small byte-code representations of data from the database, rather than the actual data. The small byte-code representations may be significantly smaller than the actual represented data, thus reducing network traffic between the client and server. The client may then retrieve the actual represented data from a corresponding data representation record.

4 Claims, 7 Drawing Sheets

U.S. PATENT DOCUMENTS

| | | | |
|---|---|---|---|
| 6,493,728 B1 | 12/2002 | Berger | |
| 6,594,666 B1 | 7/2003 | Biswas et al. | |
| 6,879,266 B1 | 4/2005 | Dye et al. | |
| 6,999,968 B1 | 2/2006 | Parkin | |
| 7,058,631 B1 | 6/2006 | Pal | |
| 7,117,222 B2* | 10/2006 | Santosuosso | 1/1 |
| 7,433,861 B2 | 10/2008 | Santosuosso | |
| 2002/0103938 A1 | 8/2002 | Brooks et al. | |
| 2002/0138463 A1 | 9/2002 | Heath | |
| 2004/0039729 A1 | 2/2004 | Boger et al. | |
| 2004/0111728 A1 | 6/2004 | Schwalm | |
| 2004/0181533 A1 | 9/2004 | Santosuosso | |
| 2006/0294055 A1 | 12/2006 | Santosuosso | |
| 2012/0041931 A1* | 2/2012 | Ross | 707/693 |

OTHER PUBLICATIONS

A.S. Hoque, D.R. McGregor, and J. Wilson, "Database Compression Using an Offline Dictionary Method", Proceedings of the Second International Conference on Advances in information Systems (Oct. 23-25, 2002). T.M. Yakhno, Ed. Lecture Notes in Computer Science, vol. 2457. Springer-Verlag, London, 11-20.

D. Starobinski, A. Trachtenberg and S. Agarwal, "Efficient PDA synchronization", IEEE Transactions on Mobile Computing, vol. 2, No. 1, pp. 40-51, Jan.-Mar. 2003.

Office Action History of U.S. Appl. No. 11/463,623 dates ranging from Oct. 2, 2007 to Dec. 22, 2008.

Office Action History of U.S. Appl. No. 10/388,070 dates ranging from Sep. 7, 2005 to May 27, 2008.

\* cited by examiner

FIG. 1

ENCODED VECTOR INDEX

SYMBOL TABLE:

| Key Value | Code | First Row | Last Row | Count |
|---|---|---|---|---|
| Alabama | 1 | 1 | 80005 | 5000 |
| Alaska | 2 | 5 | 99760 | 7300 |
| ... | | | | |
| Wisconsin | 49 | 4 | 30111 | 340 |
| Wyoming | 50 | 2 | 83000 | 2760 |

VECTOR:

| Code | 1 |
|---|---|
| Code | 50 |
| Code | 50 |
| Code | 49 |
| ... | |
| Code | 49 |
| Code | 50 |
| Code | 50 |
| Code | 1 |

*FIG. 2B*

COLUMN STATUS TABLE

| FIELD | TABLE | PRE-FORMATTED CACHING | REPRESENTATION USE |
|---|---|---|---|
| ... | | | |
| NAME | DEMOGRAPHIC | DISABLED | DISABLED |
| ... | | | |
| STATE | DEMOGRAPHIC | ENABLED | ENABLED |
| ... | | | |

*FIG. 2C*

| 164 → | PRE-FORMATTED COLUMN TABLE | | | |
|---|---|---|---|---|
| | FIELD | TABLE | UNFORMATTED DATA | PRE-FORMATTED DATA |
| 165 → | ... | | | |
| | DATE | TEST_RECORDS | 01012001 | "JANUARY 1, 2001" |
| | ... | | | |

*FIG. 2D*

| 166 → | COLUMN REPRESENTATION TABLE | | | |
|---|---|---|---|---|
| | FIELD | TABLE | REPRESENTATION | ACTUAL DATA ENTRY |
| 167 → | STATE | DEMOGRAPHIC | 01 | "ALABAMA" |
| | ... | | | |
| | STATE | DEMOGRAPHIC | 05 | "CALIFORNIA" |
| | ... | | | |

BYTE-CODE REPRESENTATIONS OF ACTUAL DATA TO REDUCE NETWORK TRAFFIC IN DATABASE TRANSACTIONS

CROSS-REFERENCE TO RELATED APPLICATIONS

This application is a continuation of U.S. patent application Ser. No. 10/388,070, filed Mar. 13, 2003 now U.S. Pat. No. 7,433,861, which is herein incorporated by reference in its entirety.

BACKGROUND OF THE INVENTION

1. Field of the Invention

The present invention generally relates to processing data and more particularly to enhancing the performance of a client through the utilization of statistical information regarding the distribution of requested data to be processed by the client.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., a client or client application) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Generally, the DBMS includes a query optimizer component configured to determine the manner in which queries will be processed. The primary task of the optimizer is to determine the most efficient way to execute each particular query against a database. To this end, the optimizer typically determines an access plan for use in executing the query against the database. In general, the access plan contains low-level information indicating precisely what steps the system is to take to execute the query. Commonly, the access plan calls for the use of one or more indexes carefully designed to speed execution of the query. Database indexes provide a relatively quick method of locating data of interest without a full sequential search through the table, which would entail accessing each row.

In general, indexes provide statistical information regarding distribution of the data within a particular database field, such as a particular column of a relational database. Examples of the type of statistical information provided by an index include the number of distinct values stored in a column and the number of occurrences of each distinct value within the column. The optimizer may use this statistical information to decide whether to use indexes and/or which indexes to use. For example, the index may indicate that a relatively small number of distinct values occur in a column of a table having a relative large number of rows. Therefore, the optimizer may access the index to determine which rows has a requested value. In such a case, the use of indexes typically results in a considerable reduction in the total number of I/O requests that must be processed in order to locate the requested data. On the other hand, if the number of distinct values is large relative to the total number of rows, a full sequential search for the requested data may be more efficient.

Commonly, a client requesting the data must perform a number of formatting operations after receiving the requested data. For example, the client may be required to convert a field from one format (e.g., a string of characters) to another format (e.g., an integer) for use in a particular operations performed by the client. In some cases, the statistical information contained in indexes may be used to enhance the performance of such formatting operations. For example, if a column contains a relatively small number of distinct values (as in the case described above), the client may store locally (e.g., in a cache) each of the distinct values in the converted format. Rather than perform the formatting operations each time one of the values is retrieved from the column, the client may simply retrieve the formatted value from the cache, thus reducing the processing overhead of formatting (creating a new object to hold the formatted value, converting the data, etc.).

However, conventional use of indexes has been limited to optimizing access of data from the database and does not extend to the requesting client. Accordingly, there is a need for an improved method of enhancing performance of a requesting client through the use of statistical information, such as that commonly contained in database indexes.

SUMMARY OF THE INVENTION

The present invention generally provides methods, articles of manufacture and systems for reducing network traffic for database transactions between a client and server by utilizing statistical information regarding requested data.

For some embodiments, a method for use by a client in accessing data from a data source generally includes obtaining information regarding one or more distinct data values stored in a field of the data source, the information including at least a byte size of the field and requesting, based at least partially on the byte size of the field, that a server of the data source send representations of the distinct values rather than actual distinct values, in response to queries for data from the field.

For some embodiments, a method for use by a server of a database generally includes receiving, from a client, a request for data from one or more fields of the database and, in response to the request, sending a representation of the requested data to the client, rather than the actual requested data, wherein the representation has a smaller byte size than the actual requested data.

For some embodiments, the article of manufacture generally includes a computer-readable medium containing a program which, when executed by a client, performs operations for accessing data from a data source. The operations generally include obtaining information regarding one or more distinct data values stored in a field of the data source, the information including at least a byte size of the field and requesting, based at least partially on the byte size of the field, that a server of the data source send representations of the distinct values rather than actual distinct values, in response to queries for data from the field.

For some embodiments, the article of manufacture generally includes a computer-readable medium containing a program which, when executed by a server, performs operations for sending data to a client. The operations generally include receiving, from the client, a request for data from one or more fields of a database served by the server and, in response to the request, sending a representation of the requested data to the client, rather than the actual requested data, wherein the representation has a smaller byte size than the actual requested data.

For some embodiments, the system generally includes a database having at least one field with one or more distinct values stored therein and a client system. The client system generally includes a cache, one or more data representation records contained in the cache, each data representation record containing one of the distinct values and a corresponding representation thereof, each representation having a smaller byte size than the distinct value it represents, and an application. The application is generally configured to receive, from a server of the database, a representation of data, and to retrieve, from a corresponding one of the data representation records, a distinct value represented by the representation.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides methods, articles of manufacture and systems for enhancing the performance of a client or client application by utilizing statistical information regarding data requested thereby. In some embodiments, the statistical information may be contained in commonly used database objects, such as a indexes. However, rather than confine the use of the statistical information contained in such objects to a query optimizer, as in conventional systems, the present invention extends the use of the statistical information to the requesting client. Through this extension, the requesting client may advantageously utilize techniques, such as column level caching to reducing formatting operations and associated processing overhead. According to another aspect of the present invention, the statistical information may be utilized to reduce network traffic between the requesting client and a database server. For example, the database server may send relatively small representations of large data values, rather than the actual values, thus consuming less network bandwidth. In other words, the user of representations may allow a larger number of records to be returned by the server in a single block. The client may then retrieve the actual values from a locally cached table, based on the received representations.

As used herein, the term client generally refers to an application that runs on any type of computer system (e.g., a personal computer, workstation, handheld computer, etc.) that relies on a server to perform some operations. The term server generally refers to an application that performs operations for a client (e.g., a database server processes queries issued by a client). The terms client and server may also refer to the respective machines (e.g., computer systems) running the client and server applications. However, the client and server applications may also reside on the same machine.

As used herein, the term database generally refers to any collection of data, regardless of the particular physical representation (or "schema") and the terms database and data source may be used interchangeably. The term schema generically refers to a particular arrangement of data. In other words, a database may be organized according to a relational schema (accessible by SQL queries), an XML schema (accessible by XML queries), or any other schema presently known or to be developed. As used herein, the term field (also commonly referred to as an entity) generally refers to any object about which data can be stored. Accordingly, the exact form of a field may depend on the particular physical data representation of the underlying database. For example, in a relational data representation, a field commonly takes the form of a column in a table.

Embodiments of the present invention may be used to advantage when accessing and manipulating data stored in any type fields from any type database regardless of the underlying schema. When accessing and manipulating the data, statistical information regarding the data may be collected from the database. The statistical information may be stored in any type of data object including, but not limited to, any type of database index, such as bitmap indexes, binary tree indexes, radix indexes, encoded vector indexes (EVIs), or any other type of indexes presently known or to be developed. However, to facilitate understanding, embodiments of the present invention will be described below with reference to column-level information contained in EVIs as a specific, but not limiting example, of a type of statistical information.

An Exemplary Environment

One embodiment of the invention is implemented as a program product for use with a computer system such as, for example, the client computer system 110 (referred to hereinafter as client 110) of the data processing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) non-writable storage media (e.g., read-only memory devices within a computer such as CD-ROM disks readable by a CD-ROM drive) on which information is permanently stored; or (ii) writable storage media (e.g., floppy disks within a diskette drive or hard-disk drive) on which alterable information is stored. The embodiments specifically include information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Figure 1:
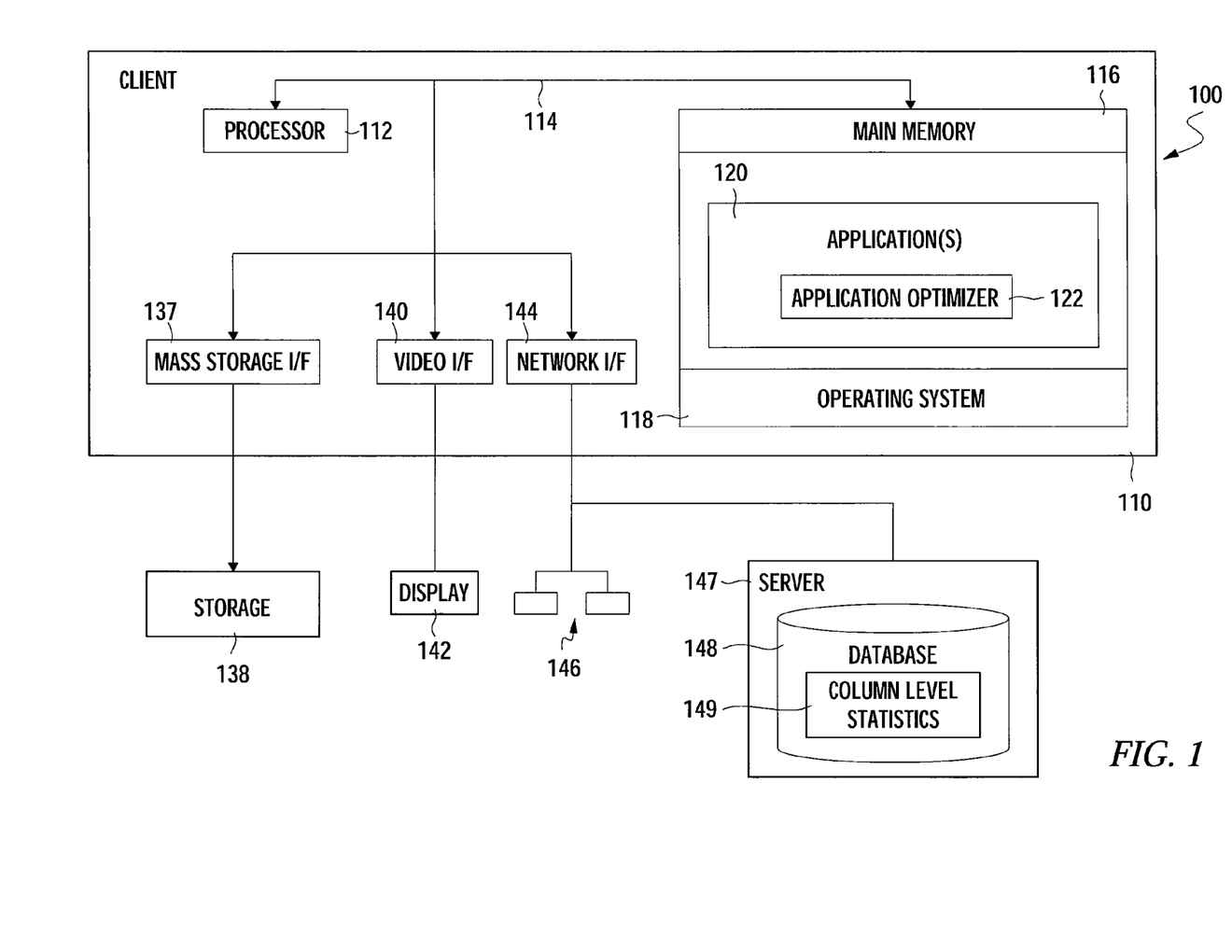
FIG. 1 is a computer system illustratively utilized in accordance with the present invention.

Referring now to FIG. 1, the data processing environment 100 is shown. In general, the data processing environment 100 includes the client 110 and one or more networked devices, such as networked devices 146 and a database server 147. The client 110 may represent any type of computer, computer system or other programmable electronic device, including a client computer, a server computer, a portable computer, an embedded controller, a PC-based server, a mini-computer, a midrange computer, a mainframe computer, and other computers adapted to support the methods, apparatus, and article of manufacture of the invention. In one embodiment, the client 110 is an eServer iSeries 400 available from International Business Machines of Armonk, N.Y.

The client 110 could include a number of operators and peripheral systems as shown, for example, by a mass storage interface 137 operably connected to a direct access storage device (DASD) 138, by a video interface 140 operably connected to a display 142, and by a network interface 144 operably connected to the one or more networked devices 146 and the database server 147. The display 142 may be any video output device for outputting viewable information. The networked devices 146 may be any combination of any type networked devices, such as, networked printers and network accessed storage (NAS) devices. The database server 147 may be used to access (e.g., serve) data from a database 148.

The client 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, main memory 116 may be considered to include memory physically located elsewhere in a client 110, for example, any storage capacity used as virtual memory or stored on a mass storage device (e.g., DASD 138) or on another computer coupled to the client 110 via bus 114.

The main memory 116 is shown configured with an operating system 118. The operating system 118 is the software used for managing the operation of the client 110. Examples of the operating system 118 include UNIX, Microsoft Windows®, and the like. As illustrated, the main memory 116 further includes at least one application 120 with an application optimizer 122. The application 120 is a software product comprising a plurality of instructions that are resident at various times in various memory and storage devices in the client 110. When read and executed by one or more processors 112 in the client 110, the application 120 causes the client 110 to perform the steps necessary to execute steps or elements embodying various aspects of the invention.

For some embodiments, the application 120 is generally configured to send queries to the database server 147 to access data from the database 148. While shown as separate from the client 110, for some embodiments, the client 110 and database server 147 may reside on the same computer system. In either case, the application optimizer 122 is generally configured to enhance performance of the application 120 in processing data received from the database 148 by accessing statistical information regarding distribution of the data in the database 148. As previously described, the format of the statistical information may depend on the underlying physical representation of the database 148. For example, if the database 148 has a relational physical representation, the statistical information may take the form of column level statistics 149 describing the distribution of data among columns within tables of the database 148.

Figure 2A:
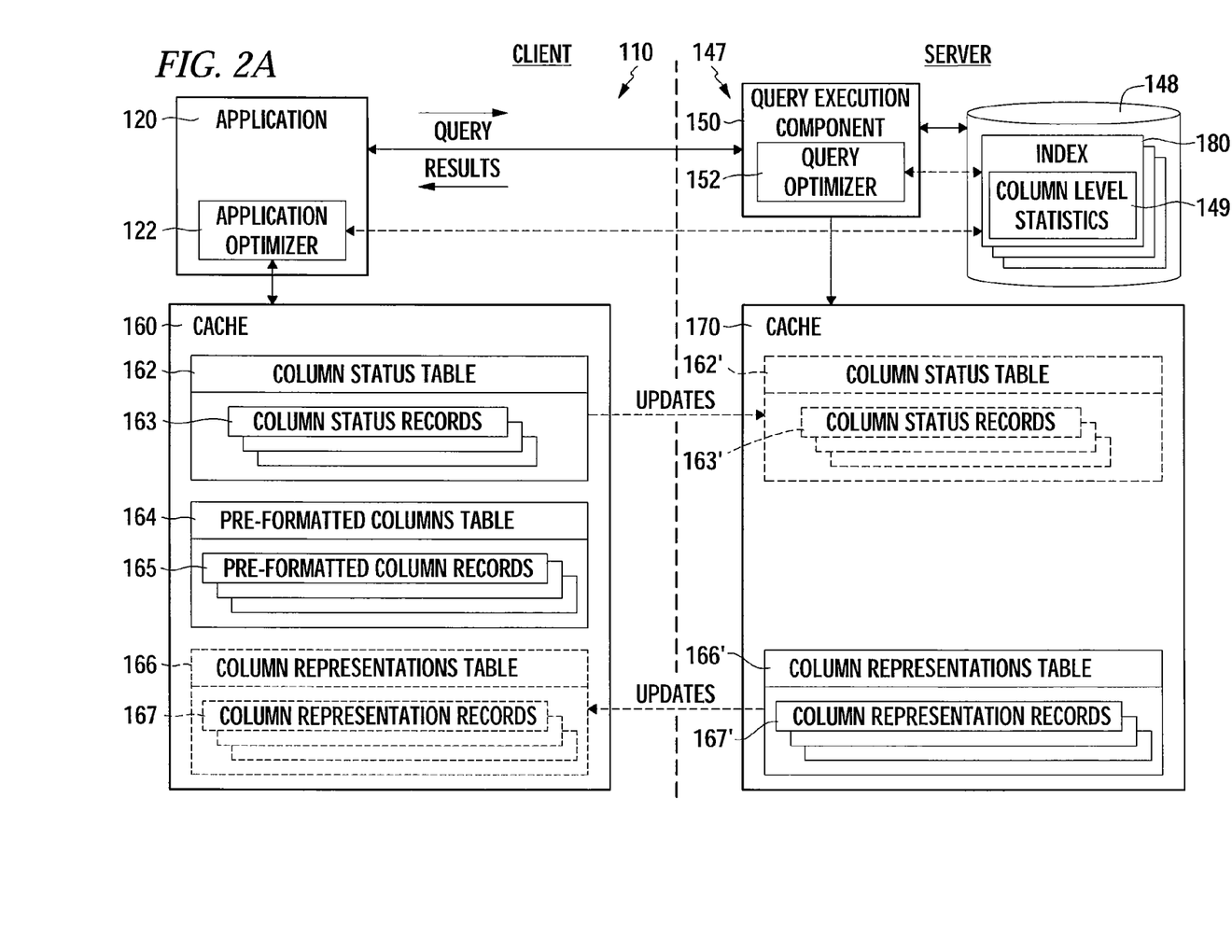
FIG. 2A is a relational view of software components of one embodiment of the present invention.

As illustrated in FIG. 2A, for some embodiments, column level statistics 149 may be contained in one or more indexes 180 created over corresponding columns of the database 148. FIG. 2A illustrates a relational view of software components of the client 110 and server 147 that may be utilized to accomplish aspects of the present invention according to one embodiment. The client application 120 may send queries to the server 147, which may be received and processed by a query execution component 150, which may include a query optimizer 152. As previously described, the query optimizer 152 may be generally configured to determine the most efficient way to execute each query against the database 148, for example, based on the column-level statistics 149 contained in the indexes 180.

An Exemplary Index

Figure 2B:
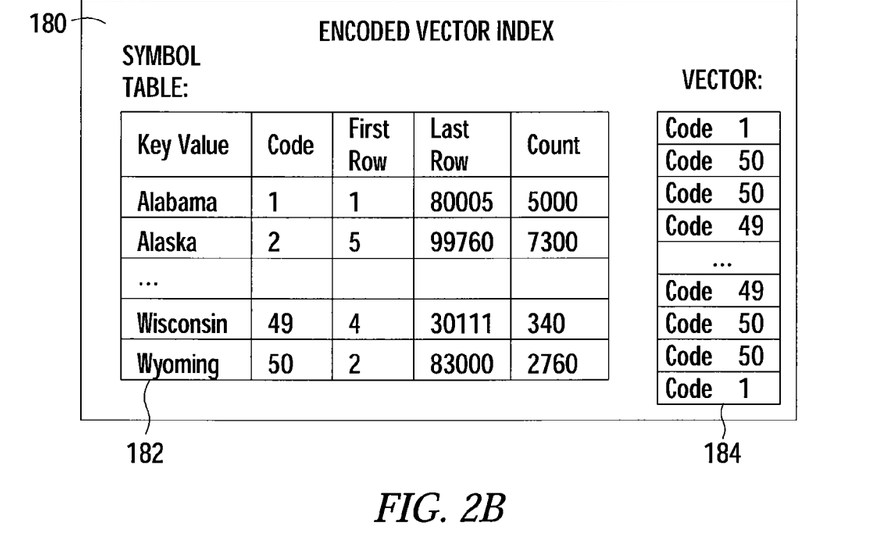
FIG. 2B illustrates an exemplary encoded vector index (EVI) that may be utilized in accordance with the present invention.

FIG. 2B shows an exemplary encoded vector index (EVI) 180 for a column of U.S. states that illustrates the type of statistical information that may be contained in an index. As shown, the EVI 180 may have two basic components: a symbol table 182 and a vector 184. The symbol table 182 contains a distinct key list corresponding to distinct values of the column, along with statistical and descriptive information about each distinct value in the index, such as the number of occurrences in the column (labeled "COUNT") of each distinct value. The symbol table 182 maps each distinct value to a distinct code. In general, any distinct value, of any length, can be represented by a small byte code, provided the byte length of the code is sufficient to represent the number of distinct values. For example, a single byte code can represent 256 distinct values, which is more than sufficient to represent 50 distinct U.S. states. The ability to represent the relatively long string lengths with a relatively small byte code provides a type of compression. As will be described in greater detail below, this concept of a low byte code representation may also be utilized to reduce network traffic (e.g., by increasing the number of records that can be transferred in a single block) between the client 110 and server 148.

The other component of the EVI 180, the vector 184, contains a byte code value for each entry in the column (i.e., each row in the relational table). This byte code corresponds to the code in the symbol table and represents the actual column value found in the respective row in the database table. The byte codes are in the same ordinal position in the vector 184, as the row it represents in the table. In other words, in the illustrated example, a "1" in the first position of the vector 184 indicates the first row of the database table has an entry for "Alabama" in the state column. The query optimizer 152 may use the symbol table 182 to obtain statistical information about the data for the column associated with the EVI. If the optimizer 152 decides to use the EVI 180 to process the query, the vector 184 may be used to build a dynamic bitmap, which contains one bit for each row in the table. If a row satisfies the query (e.g., a match between a condition and the value in the column, as indicated by the code in the vector 184), the bit is set on. If the row does not satisfy the query, the bit is set off. Similar bitmaps may be generated for other conditions of the query (using other indexes 180 generated over those columns). The bitmaps may then be ANDed together to determine which rows satisfy all of the corresponding query conditions.

In summary, the index 180 may include, among other things, the following statistical information: the type and size of data stored in the column, the number of distinct values stored in the column, and the number of occurrences of each distinct value. Referring back to FIG. 2A, as previously described, this statistical information may also be useful to the application 120, for the purposes of manipulating data requested from the database 148. Therefore, in contrast to conventional database systems, the application 120 may also access the indexes 180, for example, with an application optimizer 122.

The application optimizer 122 is a software component (e.g., a driver) included or associated with the application 120 and generally configured to optimize the manipulation (e.g., formatting, processing, etc.) of data retrieved from the database 148 by the application 120 based on the statistical information regarding the data, such as the type of statistical information that may be stored in the indexes 180. The application optimizer 122 may access the indexes 180 using any suitable technique, such as using a call level interface to the database 148. Examples of common call level interfaces include the Open Database Connectivity (ODBC) and Java Database Connectivity (JDBC™) call level interfaces.

For some embodiments, in an effort to improve efficiency of the application 120, indexes may be created specifically for columns to be accessed by the application 120. For example, while indexes are typically created over columns that are likely to be searched in order to assist the query optimizer 152 in determining a search strategy, according to the present invention, indexes may be created over columns that are likely returned as query results in order to assist the application optimizer 122 in generating various data objects that may improve the efficiency with which the application 120 manipulates data retrieved from the columns.

Caching Pre-Formatted Data Objects and Data Representations

The various data objects may include a column status table 162, a pre-formatted columns table 164, and a column representations table 166, shown in FIG. 2A as residing in a client-side cache 160. As illustrated, copies of the column status table 162 and column representations table 166 (having reference numerals 162' and 166', respectively) may also reside in a server-side cache 170 for use in server-side operations to be described below. The column status table 162 may include one or more column status records 163, each corresponding to a column of the database 148. In general, the column status records 163 indicate (e.g., to the application optimizer 122 and the query optimizer 152) whether certain features of the present invention, such as the caching of pre-formatted column values and the use of byte-code representations of actual column values, are enabled.

Figure 2C:
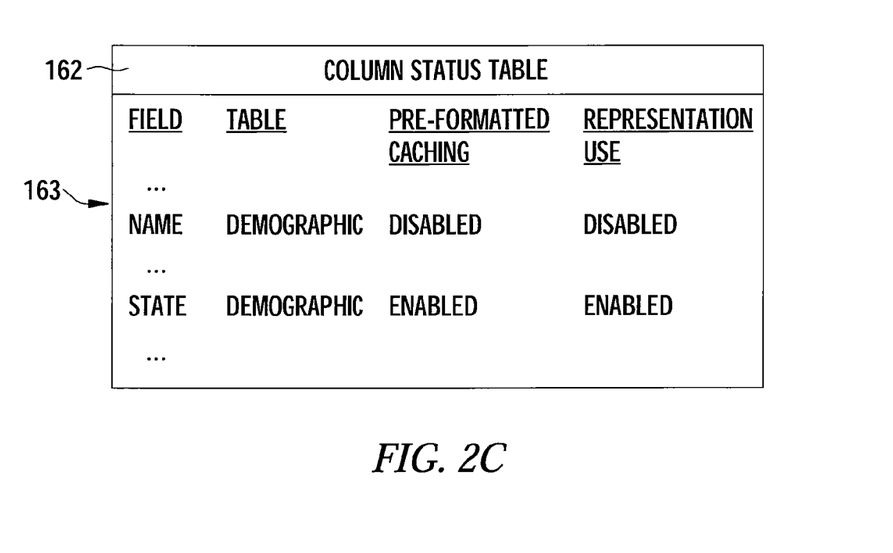
FIGS. 2C-E illustrate exemplary data objects that may be utilized in accordance with the present invention.

FIG. 2C illustrates an exemplary column status table 162 having column status records 163 according to one embodiment of the present invention. As illustrated, the column status records 163 may have fields to identify the column, the associated database table containing the column, and status flags (i.e., Boolean fields that may be ENABLED or DISABLED) to indicate whether pre-formatted caching and/or the use of representations is enabled. The status flags may be tested by the client 110 and/or the server 147 to determine which features (if any) are enabled for a given column. Of course, for various embodiments, the types of fields in the column status record may differ. For example, for some embodiments, only one of pre-formatted caching or the use of representations may be implemented and, therefore, the column status records 163 may only have a status flag for the implemented feature.

Figure 2D:
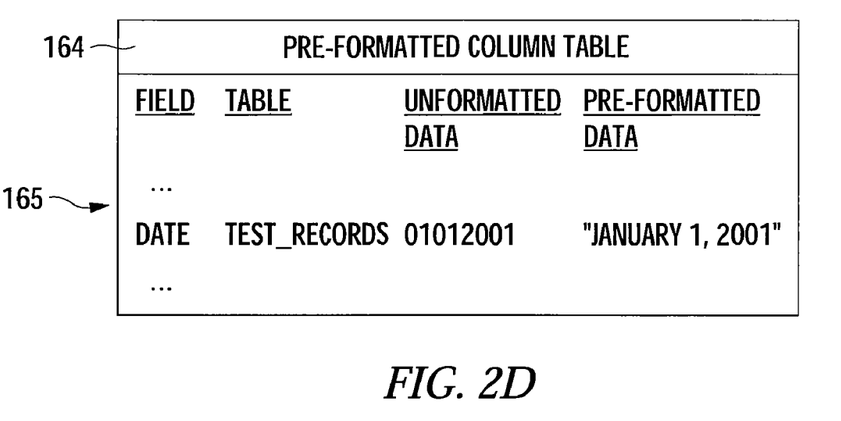

If the caching of pre-formatted column values is enabled, rather than manually format a data object retrieved from the database 148, the client 110 may retrieve a pre-formatted data object from a corresponding pre-formatted column record 165 in the pre-formatted column records table 164. Thus, caching pre-formatted column values may reduce processing overhead associated with formatting. As an example, the client 110 may be required to retrieve a date from the database 148 for display to a user. While the date may be stored in a DATE column of the database 148 as a byte string, for example, the client 110 may be required to format the date to a standard readable format. As illustrated in FIG. 2D, a pre-formatted column record 165 corresponding to a distinct value of the date column may be generated. Rather than format the data received (e.g., a byte string "01012001"), the client 110 may retrieve the pre-formatted data object (e.g., a character string "Jan. 1, 2001"), thus avoiding the processing overhead associated with formatting (e.g., creation of a data object for the formatted object, converting the data to the proper format, etc.).

Figure 2E:
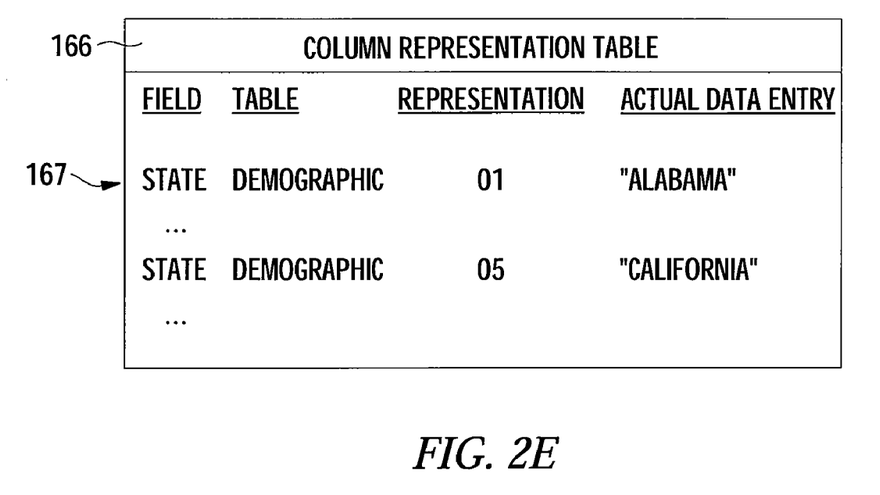

If the use of data representations is enabled, rather than send potentially large (e.g., many bytes) requested data entries, the server 147 may send smaller (e.g., fewer bytes) representations of the data entries, thus increasing the number of rows that may be transferred per block and reducing network traffic between the server 147 and client 110. The client 110 may then retrieve the actual data entries from the column representation table 166. As an example, upon receiving a single byte-code representation "01" for a state, the client may retrieve the actual state name "Alabama" from a column representation record 167, such as that illustrated in the column representations record table 166 of FIG. 2E.

Exemplary Operations

Figure 3:
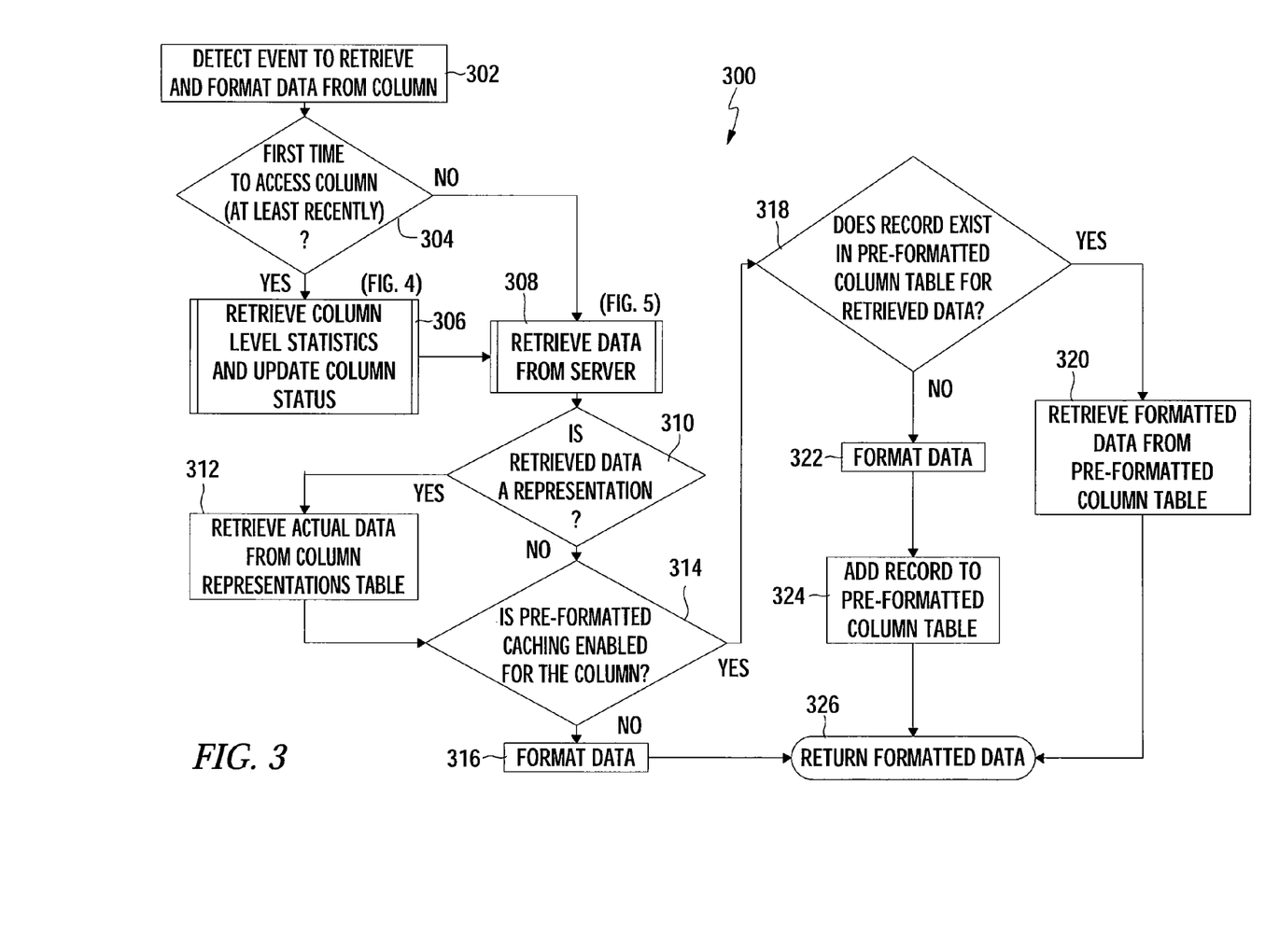
FIG. 3 is a flow chart illustrating exemplary operations for accessing data according to aspects of the present invention.

The concepts of pre-formatted column caching and the use of data representations may be further explained with reference to FIG. 3, which illustrates exemplary operations 300 that may be performed by the client 110 to access and manipulate data from the database 148. The operations 300 begin at step 302, by detecting an event (e.g., a need in the application 120) to retrieve and format data from a column of the database 148.

Figure 4:
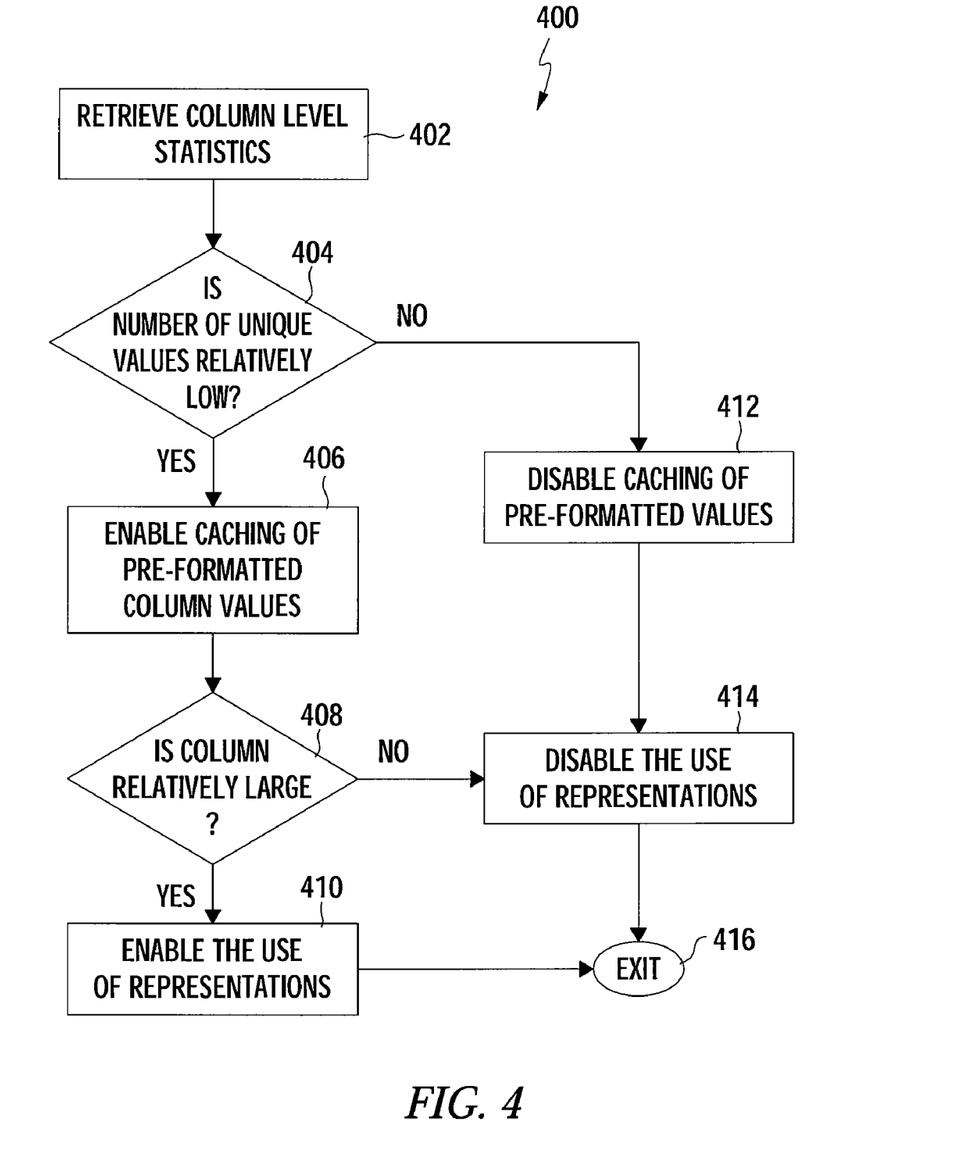
FIG. 4 is a flow chart illustrating exemplary operations for processing column level statistics according to aspects of the present invention.

At step 304, a determination is made as to whether the column has been accessed before, for example, within a predetermined time period or since the application 120 has been invoked. If the column has not been accessed before, statistics for the column are retrieved, at step 306, for example, by accessing an index 180 for the column, and a status record 163 corresponding to the column is updated (and/or created, if necessary) based on the column-level statistics. FIG. 4 illustrates exemplary operations for updating a status record 163 based on statistics of a corresponding column.

Figure 5:
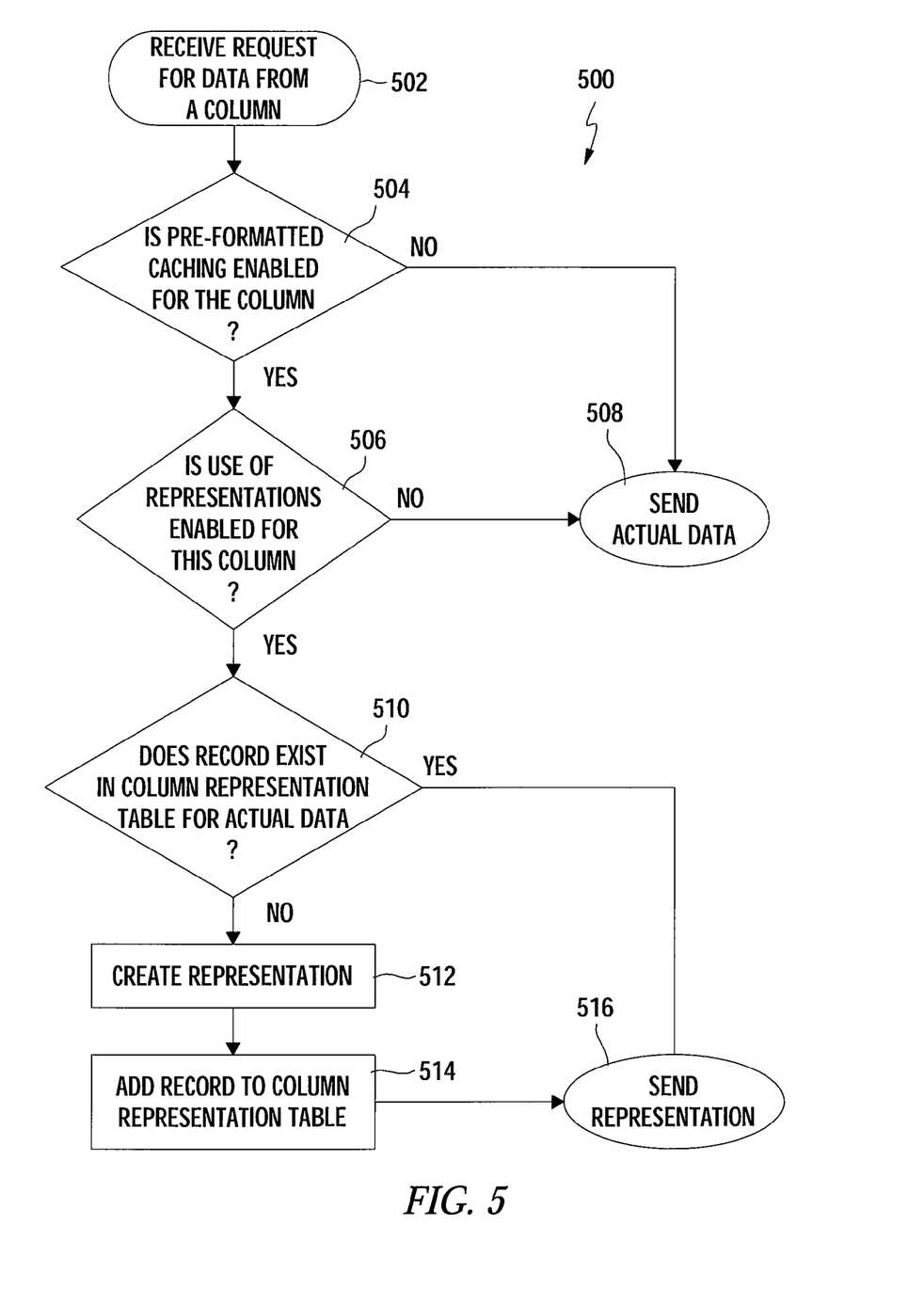
FIG. 5 is a flow chart illustrating exemplary operations for serving data according to aspects of the present invention.

Once the column level statistics have been retrieved and the corresponding column status record 163 has been updated (or if the column had been accessed before), processing proceeds to step 308 to retrieve data from the server 147. For example, an appropriate query may be sent to the server 147 to retrieve the requested data. FIG. 5, described below, illustrates exemplary operations the server 147 may perform upon receiving the request for data from the client 110, for example, to determine whether to send to the client the actual data requested or a (smaller byte size) representation of the actual requested data.

At step 310, the client 110 determines whether the data retrieved from the server 147 is the actual requested data or a representation of the requested data, for example, by checking the corresponding flag in the column status record 163. If the retrieved data is a representation of the requested data, the actual requested data is retrieved from the column representations table 166, at step 312. For example, the client 110 may search the column representations table 166 for a column representation record 167 with a representation field that matches the representation sent by the server 147.

Once the client has the actual requested data (whether received directly from the server 147 or retrieved from the column representations table 166), a determination is made, at step 314, as to whether pre-formatted caching is enabled for the column. As previously described, the determination may be made by examining (the pre-formatted enabled flag of) the column status record 163 for the column. If pre-formatted caching is not enabled, the data is formatted at step 316, and the formatted data is returned (e.g., to the application 120 for further processing), at step 326.

If pre-formatted caching is enabled, at step 318, a determination is made as to whether a pre-formatted record 165 already exists for the retrieved data in the pre-formatted column table. If so, at step 320, the pre-formatted data object is retrieved from the corresponding pre-formatted record 165 for the column value returned, and the pre-formatted data object is returned, at step 326. If a pre-formatted record 165 does not exist for the retrieved data, the data is formatted, at step 322, and a pre-formatted record 165 containing the formatted data is added to the pre-formatted column table 164, at step 324, prior to returning the formatted data, at step 326. In other words, the first time a new column value is returned, the client 110 may generate a new pre-formatted column record 165, which may be used the next time the same column value is returned.

Analyzing Column-Level Statistics

As previously described, FIG. 4 illustrates exemplary operations 400 that may be performed by the client 110 to create and/or update column status records 163 (e.g., to enable or disable pre-formatted column caching and/or the use of representations for a given column), based on the corresponding column-level statistics. In general, the higher the likelihood that a distinct value will be returned repeatedly from the column, the more desirable it will be to enable the caching of pre-formatted data and/or the use of smaller byte-codes to represent actual data values for the column. In other words, the more often the distinct value is accessed from a column, the greater the increase in client performance due to pre-formatted column caching and/or the greater the increase in network bandwidth due to the use of smaller byte representations of actual column values.

For some embodiments, a determination of whether any distinct value of a column is likely to be returned relatively often may be made by examining the number of distinct values in the column. For example, a predetermined threshold value may be defined. If the number of distinct values is below the threshold value, it may be determined that at least some of the distinct values will be returned relatively often. The predetermined threshold ($N_{THRESHOLD}$) may be set relative to a total number of entries (rows) for the column. As an example, referring back to FIG. 2D, in a table with thousands of rows of patient records, the threshold value may be set at 100. A column of names may have thousands of distinct values ($>N_{THRESHOLD}$), while a column of states will have at most fifty distinct values ($<N_{THRESHOLD}$). Therefore, the likelihood of a distinct value being returned relatively often from the state column is higher than the likelihood of a distinct value being returned relatively often from the name column.

For other embodiments, rather than examine only the number of distinct values in the column, the number of occurrences (e.g., as indicated by the COUNT field in the symbol table 182 of FIG. 2B) of each distinct value may also be examined and possibly compared to the total number of entries for the column. This may be preferable, for example, if a column contains a relatively high number of distinct values with a small number of these distinct values occurring much more often than others. In other words, this relatively small number of distinct values are likely to be returned relatively often. Therefore, pre-formatted column caching may still be enabled for this column.

The operations 400 begin, at step 402, by retrieving statistics for a column for which data is to be retrieved. At step 404, a determination is made (for example, as described above) as to whether any of the distinct values of the columns are likely to be returned relatively often. If it is determined that none of the distinct values of the column are likely to be returned relatively often, the advantages to pre-formatted caching and/or the use of data representations for that particular column may not justify the overhead in creating the necessary tables. Therefore, at step 412, pre-formatted caching is disabled for the column and, at step 414, the use of representation for the column is disabled, for example, by clearing the respective flags for these features in the column status record 163.

If it is determined that at least some of the distinct values of the column are likely to be returned relatively often, pre-formatted caching is enabled, at step 406. At step 408, the size of the column is examined to determine if the use of representations should be enabled for the column. If the column is relatively large, the use of representations is enabled, at step 410. For example, the size (in bytes) of the column may be compared to the number of bytes required to represent the distinct values in the column. Again, using the states column as an example (and assuming no abbreviations are used), the size of the column may be relatively large (e.g., to hold up to 14 characters for the Carolinas), while a single byte code may be used to represent all 50 states, resulting in substantial compression of the column data.

On the other hand, if the column is not relatively large, the use of representations is disabled, at step 414. For example, if the states in the column are stored as 2 letter abbreviations, a single-byte code would only represent a two-to-one reduction, which may not justify the use of representations, considering it is the data alone that is, in effect, compressed by the representation, and not the rest of the query results message (header, checksum, etc). The operations 400 are exited, at step 416, for example, by returning an updated column status record 163.

Server-Side Operations

As previously described, the server 147 may be configured to perform certain operations in order to implement the use of representations. FIG. 5 is a flow diagram of one example of such operations 500 the server 147 may perform to determine whether to send actual data or a representation of actual data. The operations 500 begin at step 502, by receiving a request (e.g., from the client 110), for data from a column of the database 148.

At step 504, a determination is made as to whether pre-formatted caching is enabled for the column, for example, by testing a flag in the column status record 163 associated with the column for which data is requested. As previously described, for some embodiments, the use of representations may be disabled when caching is disabled. Therefore, if caching is disabled, the actual data is sent, at step 508. Of course, for some embodiments, the use of representations may be enabled independently of pre-formatted caching. Regardless, even if caching is enabled, but the use of representations is disabled (e.g., the column is not large enough), as determined at step 506, the actual data is sent, at step 508.

If the use of representations is enabled, however, a determination is made, at step 510, as to whether a representation record 167' for the actual requested data already exists. For example, the server 147 may search the column representation table 166' for a column representation record 167' for to the actual data. If a column representation record 167' already exists, the representation is sent to the client 110, at step 516. If a representation 167' does not exist, a representation is generated, at step 512, and, at step 514, a column representation record 167' containing the newly generated representation is added to the column representation table 166' (e.g., for use in processing a subsequent request), prior to returning the representation, at step 516. Any suitable techniques may be utilized to generate the representation, such as a the use of compression algorithms, any type of assignment algorithms, sequential numbering, or any other type function. Of importance is that each representation corresponds to a different distinct value of the column, and has fewer bytes.

Of course, the operations 500 are exemplary only and the illustrated operations may be varied for different embodiments. For example, for some embodiments, the decision to use representations for a column may be made at the server 147 rather than the client 110. Therefore, a server side process (e.g., the query optimizer 152) may examine the column size (e.g., similar to step 412 of FIG. 4) to determine whether representations should be used for a column and may, therefore, update the corresponding column status record 163 accordingly.

Synchronizing Commonly Accessed Records

Regardless of whether the decision to use representations is made at the client or server, it is important to ensure that the column status tables 162/162' and column representations tables 166/166' are synchronized. For example, the client 110 needs to know when the server 147 is sending a representation rather than the actual requested data, as well as the actual column value represented. For some embodiments, a protocol may be established to ensure that tables accessed by both the client 110 and server 147 are current. For example, when enabling/disabling pre-formatted caching or the use of representations for a column, the client 110 may send the corresponding column status record 163 to the server 147 for use in updating/replacing a column status record 163'. In a similar manner, when the server creates a new representation, the associated representation record 166 may be sent to the client to add to the client-side cache.

Conclusion

While the conventional use of database indexes has been limited to providing statistics (e.g., column-level statistics) regarding distribution of data to a query optimizer in an effort to enhance searching, aspects of the present invention extend the use of database indexes to a requesting client. For example, the client may access indexes (or other type objects that provide information regarding distribution of data in a database) in an effort to enhance the manipulation and/or access of requested data. Data likely to be returned often (e.g., as indicated by a relatively low number of distinct values in a column) may be pre-formatted and stored in a cache. Upon receiving data, rather than formatting the received data, the client may retrieve pre-formatted data from the cache, thereby reducing processing overhead. For some embodiments, the client may also determine that data likely to be returned is relatively large (i.e., high number of bytes). The client may request that a relatively small representation (i.e., fewer bytes) of the data be sent instead of the actual data, thus increasing the number of rows returned in each block and thereby reducing network traffic between the client and server.

While the foregoing is directed to embodiments of the present invention, other and further embodiments of the invention may be devised without departing from the basic scope thereof, and the scope thereof is determined by the claims that follow.

What is claimed is:

1. A non-transitory computer readable storage medium containing a program which, when executed by a client, performs operations for accessing data from a data source comprising:
   obtaining information regarding one or more distinct data values stored in a field of the data source, the information including at least a byte size of the field;
   requesting, based at least partially on the byte size of the field, that a server of the data source send representations of the distinct values rather than actual distinct values, in response to queries for data from the field;
   sending, to the data source, a query for data from the field;
   receiving, in response to the query, a representation of one of the distinct values rather than the actual distinct value; and
   retrieving the actual distinct value from a data object, stored on the client, containing the actual distinct value.

2. The non-transitory computer readable storage medium of claim 1, wherein the operations further comprise receiving, from the server, the data object containing the actual requested data.

3. A non-transitory computer readable storage medium containing a program which, when executed by a server, performs operations for sending data to a client comprising:

receiving, from the client, a request for data from a field of a database served by the server, wherein the request is based at least partially on a byte size of the field;

determining whether a representation has been generated for the requested data;

upon determining that a representation has not been generated, generating a representation for the requested data;

in response to the request, sending the representation to the client, rather than the actual requested data, wherein the representation has a smaller byte size than the actual requested data; and sending to the client a data object containing the representation and the actual requested data.

4. A non-transitory computer readable storage medium containing a program which, when executed by a client, performs operations for accessing data from a data source comprising:

obtaining information regarding one or more distinct data values stored in a field of the data source, the information including at least a byte size of the field;

requesting, based at least partially on the byte size of the field, that a server of the data source send representations of the distinct values rather than actual distinct values, in response to queries for data from the field;

sending, to the data source, a query for data from the field;

receiving, in response to the query, a representation for each of the distinct values rather than the respective actual distinct value; and retrieving, by the client, the actual distinct value from a data object containing the actual distinct value.

\* \* \* \* \*